United States Patent
Rozner et al.

(10) Patent No.: US 10,733,742 B2
(45) Date of Patent: Aug. 4, 2020

(54) IMAGE LABELING

(71) Applicant: International Business Machines Corporation, Armonk, NY (US)

(72) Inventors: Eric Rozner, Boulder, CO (US); Chungkuk Yoo, Daejeon (KR); Inseok Hwang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/142,743

(22) Filed: Sep. 26, 2018

(65) Prior Publication Data

US 2020/0098116 A1   Mar. 26, 2020

(51) Int. Cl.
*G06T 7/246*   (2017.01)
*G06N 3/04*   (2006.01)
*G06K 9/62*   (2006.01)
*G06K 9/00*   (2006.01)

(52) U.S. Cl.
CPC .......... *G06T 7/251* (2017.01); *G06K 9/00671* (2013.01); *G06K 9/6202* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 8,081,816 B1 | 12/2011 | Irick et al. | |
| 9,280,830 B2 | 3/2016 | Irie et al. | |
| 9,864,933 B1 | 1/2018 | Cosic | |
| 2005/0213810 A1* | 9/2005 | Sabe | G06K 9/00248 382/159 |

(Continued)

FOREIGN PATENT DOCUMENTS

| | | |
|---|---|---|
| CN | 106250103 | 12/2016 |
| CN | 107506707 | 12/2017 |

(Continued)

OTHER PUBLICATIONS

Doyle, Daniel D., Alan L. Jennings, and Jonathan T. Black. "Optical flow background estimation for real-time pan/tilt camera object tracking." Measurement 48 (2014): 195-207. (Year: 2014).*

(Continued)

*Primary Examiner* — Andrae S Allison
(74) *Attorney, Agent, or Firm* — Law Office of Jim Boice

(57) ABSTRACT

A method enables object label persistence between subsequent images captured by a camera. One or more processors receive a first image, which is captured by an image sensor on a camera, and which includes a depiction of an object. The processor(s) generate a label for the object, and display the first image on a display. The processor(s) subsequently receive movement data that describes a movement of the camera after the image sensor on the camera captures the first image and before the image sensor on the camera captures a second image. The processor(s) receive the second image. The processor(s) display the second image on the display, and then detect a pixel shift between the first image and the second image as displayed on the display. The processor(s) then label the object with the label on the second image as displayed on the display.

20 Claims, 13 Drawing Sheets

(56) References Cited

U.S. PATENT DOCUMENTS

| | | | | |
|---|---|---|---|---|
| 2007/0229673 | A1* | 10/2007 | Araya | H04N 5/23232 348/220.1 |
| 2011/0141227 | A1* | 6/2011 | Bigioi | H04N 13/106 348/36 |
| 2012/0158432 | A1* | 6/2012 | Jain | G06Q 10/10 705/3 |
| 2012/0300996 | A1* | 11/2012 | Nakamura | G06K 9/0014 382/128 |
| 2014/0006229 | A1* | 1/2014 | Birch | G06Q 10/087 705/28 |
| 2015/0279049 | A1* | 10/2015 | Tojo | G06K 9/4642 382/164 |
| 2017/0103299 | A1 | 4/2017 | Aydonat et al. | |
| 2017/0221176 | A1 | 8/2017 | Munteanu et al. | |
| 2017/0223250 | A1* | 8/2017 | Ajito | H04N 5/23212 |
| 2018/0046903 | A1 | 2/2018 | Yao et al. | |
| 2018/0063454 | A1* | 3/2018 | Olsson | H04N 5/33 |
| 2018/0090173 | A1* | 3/2018 | Bradley | G11B 27/007 |
| 2018/0090175 | A1* | 3/2018 | Bradley | G11B 27/007 |
| 2018/0091697 | A1* | 3/2018 | Fujita | G03G 15/043 |
| 2018/0150684 | A1 | 5/2018 | Wang et al. | |
| 2018/0158197 | A1 | 6/2018 | Dasgupta et al. | |
| 2018/0181838 | A1 | 6/2018 | Yang | |
| 2018/0189587 | A1 | 7/2018 | Mandal et al. | |

FOREIGN PATENT DOCUMENTS

| | | |
|---|---|---|
| CN | 107862650 | 3/2018 |
| WO | 2018071546 | 4/2018 |
| WO | 2018145308 | 8/2018 |

OTHER PUBLICATIONS

P. Mell et al., "The NIST Definition of Cloud Computing", National Institute of Standards and Technology, Information Technology Laboratory, Sep. 2011, pp. 1-7.

Zhu, Y., et al, "Euphrates: Algorithm-SoC Co-Design for Low-Power Mobile Continuous Vision", ACM/IEEE 45th Annual International Symposium on Computer Architecture (ISCA), 2018, pp. 1-14.

M. Xu et al, "Deepcache: Principled Cache for Mobile Deep Vision", <https://arxiv.org/abs/1712.01670> 2018, pp. 1-16.

M. Xu et al., "Accelerating Convolutional Neural Networks for Continuous Mobile Vision Via Cache Reuse", <https://www.researchgate.net/publication/321570921_Accelerating_Convolutional_Neural_Networksfor Continuous_Mobile_Vision_via_Cache_Reuse>, Dec. 2017, pp. 1-13.

L. Huynh et al.,"Deepmon: Mobile GPU-Based Deep Learning Framework for Continuous Vision Applications", ACM, Mobisys'17, 2017, pp. 82-95.

L. Cavigelli et al, "CBINFER: Change-Based Inference for Convolutional Neural Networks on Video Data", <http://arxiv.org/pdf/1704.04313.pdf> 2017, pp. 1-8.

M. Buckler et al., "EVA2: Exploiting Temporal Redundancy in Live Computer Vision", <https://arxiv.org/abs/1803.06312>, 2018, pp. 1-14.

M. Courbariaux et al., "Binarized Neural Networks: Training Neural Networks With Weights and Activations Constrained to +1 or −1", <https://arxiv.org/abs/1602.02830>, 2016, pp. 1-11.

M. Rastegari et al., "XNOR-Net: Imagenet Classification Using Binary Convolutional Neural Networks", <https://arxiv.org/abs/1603.05279>, 2016, pp. 1-17.

K. Hegde et al., "UCNN: Exploiting Computational Reuse in Deep Neural Networks Via Weight Repetition", Proceedings of the 45th International Symposium on Computer Architecture (ISCA), 2018, pp. 1-14.

P. Guo et al., "Potluck: Cross-Application Approximate Deduplication for Computation-Intensive Mobile Applications", ACM, ASPLOS'18, 2018, pp. 271-284 (Abstract Only).

S. Han et al., "MCDNN: An Approximation-Based Execution Framework for Deep Stream Processing Under Resource Constraints", ACM, Mobisys'16, 2016, pp. 1-14.

Y. Lu et al., "Efficient Object Detection for High Resolution Images", <https://arxiv.org/abs/1510.01257>, 2015, pp. 1-8.

Z. Meng et al., "Detecting Small Signs From Large Images", <https://www.researchgate.net/publication/317954746_Detecting_Small_Signs_from_Large_Images>, 2017, pp. 1-9.

C. Kim et al., "A Hybrid Framework Combining Background Subtraction and Deep Neural Networks for Rapid Person Detection", Journal of Big Data, 5:22, 2018, pp. 1-24.

M. Riera et al., "Computation Reuse in DNNS by Exploiting Input Similarity", 2018 ACM/IEEE 45th Annual International Symposium on Computer Architecture (ISCA), 2018, pp. 1-12.

List of IBM Patents or Patent Applications Treated As Related, Sep. 26, 2018.

* cited by examiner

IMAGE LABELING

BACKGROUND

The present disclosure relates to the field of image capturing devices, and specifically to image capturing devices that are sensor enabled. Still more particularly, the present disclosure relates to sensor-enabled image capturing devices that are able to label objects depicted with images generated by the sensor-enabled image capturing devices.

SUMMARY

In an embodiment of the present invention, a method enables object label persistence between subsequent images captured by a camera. One or more processors receive a first image, which is captured by an image sensor on a camera, and which includes a depiction of an object. The processor(s) generate a label for the object, and display the first image on a display. The processor(s) subsequently receive movement data, from a movement sensor on the camera, that describes a movement of the camera after the image sensor on the camera captures the first image and before the image sensor on the camera captures a second image. The processor(s) receive the second image, which is captured by the image sensor on the camera. The processor(s) display the second image on the display, and then detect a pixel shift between the first image and the second image as displayed on the display. The processor(s) determine that the second image includes the depiction of the object from the first image based on the movement of the camera and the pixel shift, and then labels the object with the label on the second image as displayed on the display.

In one or more embodiments, the method is performed by an execution of a computer program product.

In an embodiment of the present invention, a camera includes: an image sensor, where the image sensor captures a first image and a second image, and where the first image includes a depiction of an object; a labeling logic that generates a label for the object; a display logic for displaying the first image; a movement sensor that generates movement data that describes a movement of the camera after the image sensor on the camera captures the first image and before the image sensor on the camera captures the second image; a pixel shift detector that detects a pixel shift on the display between the first image being displayed and the second image being displayed on the display; and an object identifier logic for determining that the second image includes the depiction of the object from the first image based on the movement of the camera and the pixel shift, where the object identifier logic labels the object with the label on the second image as displayed on a display.

DETAILED DESCRIPTION

Figure 1:
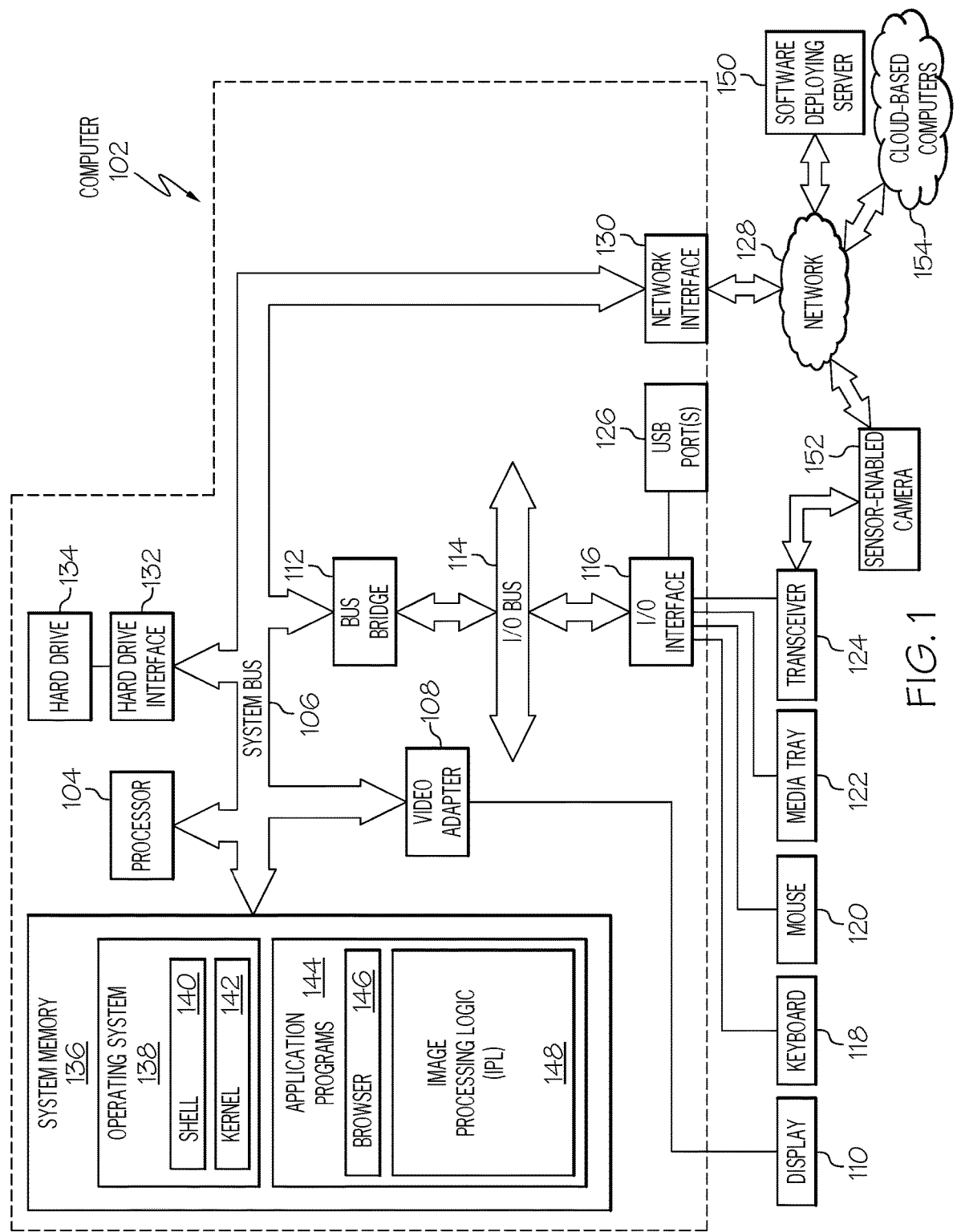
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or sensor-enabled camera 152 and/or cloud-based computers 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Image Processing Logic (IPL) 148. IPL 148 includes code for implementing the processes described below, including those described in FIGS. 2-10. In one embodiment, computer 102 is able to download IPL 148 from software deploying server 150, including in an on-demand basis, wherein the code in IPL 148 is not downloaded until needed for execution. Note further that, in one embodiment of the present invention, software deploying server 150 performs all of the functions associated with the present invention (including execution of IPL 148), thus freeing computer 102 from having to use its own internal computing resources to execute IPL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Image and video processing is increasingly important to a variety of tasks, such as object detection, object/facial recognition, object segmentation, image question-answer, video question-answer, etc. Convolutional Neural Networks (CNNs) provide deep-learning architectures that achieve state-of-the-art performance on many Artificial Intelligence (AI) challenges.

However, CNN computations are expensive. That is, several billions of multiplications and additions are required to classify even low-resolution images. If such processing is performed on a cloud, then the bandwidth required to move image data to the cloud (or fog) is very high.

Figure 2:
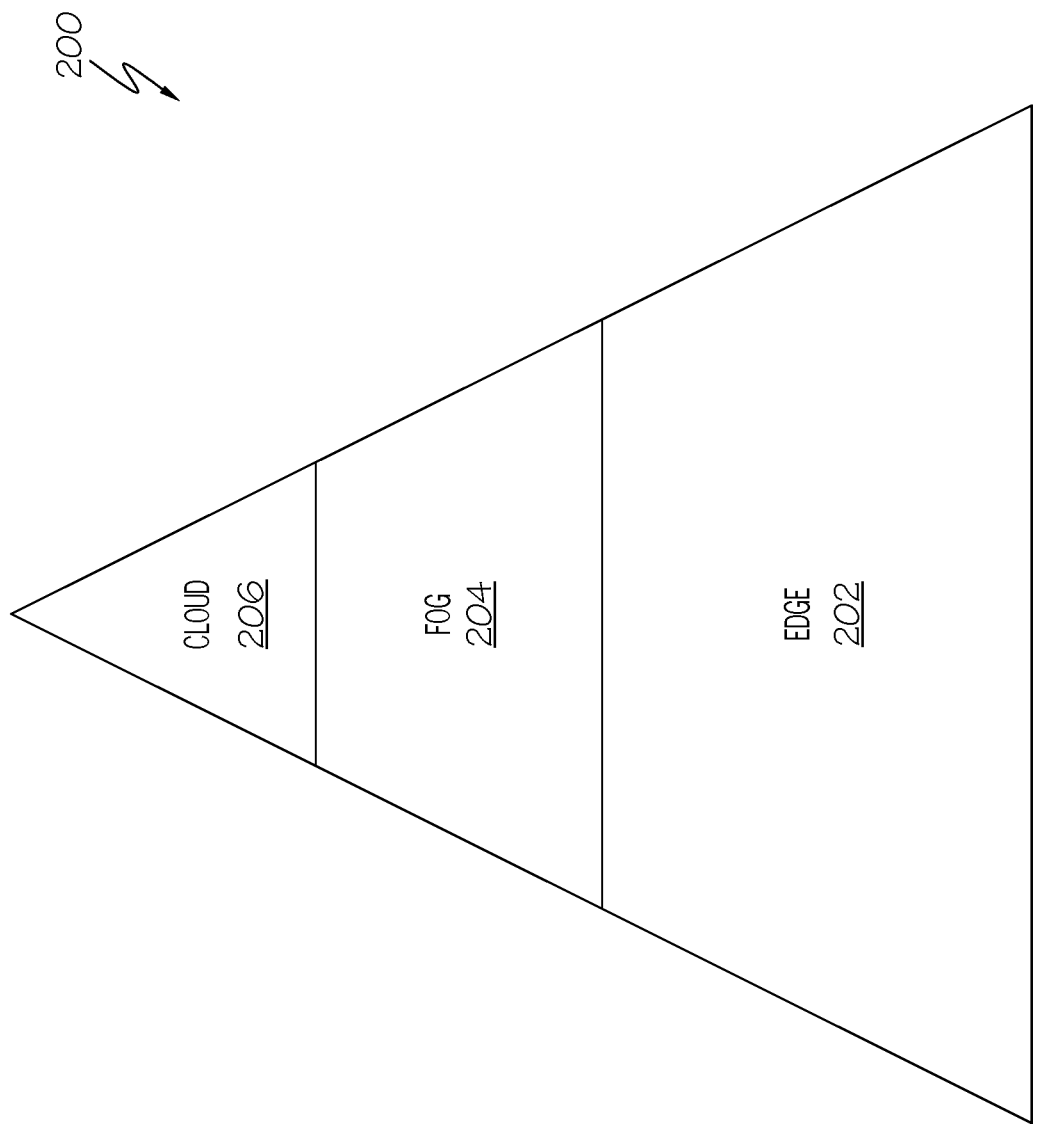
FIG. 2 depicts an overview of a hierarchy of processing abilities in a cloud-based system in accordance with one or more embodiments of the present invention.

For example, consider now FIG. 2, which depicts a pyramid graph 200 of devices that utilize cloud and/or fog resources. At the bottom of the pyramid graph 200 is an edge 202, which includes devices such as cell phones, digital cameras, client computers (i.e., laptop computers, desktop computers, etc.). As suggested by the shape of pyramid graph 200, edge 202 includes a very large number (e.g., billions) of devices. In accordance with one or more embodiments of the present invention, the edge 202 includes devices that are 1) able to capture images, but 2) have limited computing power as compared with devices found in fog 204 and/or cloud 206, where the devices found in fog 204 and/or cloud 206 are analogous to the cloud-based computers 154 shown in FIG. 1.

For example, fog 204 includes servers and other computing/storage devices that number in the millions. Fog 204 handles many, if not most, of the processing needs of the devices in edge 202. Fog 204 sends the results of its processing operations not only to the devices in edge 202, but also to data centers found in the cloud 206.

While fog 204 and/or cloud 206 have the computational power to evaluate images created by the devices in edge 202, this creates several problems. First, if the edge 202 and the fog 204 (and/or cloud 206) are required to exchange all images, data, computational results, etc., this presents a heavy burden on communication networks (which are often wireless and thus have even less bandwidth) between the edge 202 and the fog 204 (and/or cloud 206). Second, using the fog 204 and/or cloud 206 to perform all analytical calculations for captured images (e.g., for labeling objects the captured images) poses scaling problems when determining which nodes in the fog 204 and/or data centers in the cloud 206 are to be allocated to devices in the edge 202.

If the devices in the edge 202 had their own computational power to perform any type of analysis of the images they capture, then they would not need the computational resources in the fog 204 and/or the cloud 206. However, this is not the case. Rather, the devices in the edge 202 often have limited computational and/or storage capacities. Thus, one or more embodiments of the present invention solve this problem by using previously performed calculations (by the devices themselves and/or by the fog 204 and/or the cloud 206) on a captured image, particularly when the previously performed calculations are from previously-captured images.

In one or more embodiments, the present invention utilizes a Convolutional Neural Network (CNN) to analyze a video image and caches CNN-based analysis results for use with other captured images (that differ due to camera movement).

However, as also described herein, in one or more embodiments the present invention caches non-CNN generated data about an image for reuse when the capturing camera moves (thus capturing a new image).

Thus, one or more embodiments of the present invention is utilized when capturing subsequent images by a moving camera. That is, a camera may be part of a drone, a satellite, etc., or it may be hand-held. The captured subsequent images will vary, due to the movement of the camera, even though some of the information in the images is redundant, due to the overlap between the subsequent captured photographs.

Such captured subsequent images may be used to monitor equipment (e.g., oil rigs), wildlife, inventory (e.g., in a store, a warehouse, etc.), public infrastructure (e.g., roads, power lines, etc.), etc.

As just described, a moving camera taking a series of photographs (e.g., every second) will capture some objects that look the same between photographs and other objects that look different between photographs. For example, assume that a person is holding out a cell phone to take a series of pictures of himself (i.e., "selfies") while riding on an escalator. The image of the user is the same, but objects in the background (or persons that the user passes, such as escalator riders going in the opposite direction) are changing.

Assume now that the user/system wants to label objects in all photographs from the series of photographs, whether they are changing or not. However, if every photograph is analyzed in its entirety, then there will be duplicate processing of the unchanging image of the user in this example.

One process for reducing duplicate processing of the information from the series of photographs is to perform a full-image analysis of a first photograph in the series of photographs; cache the full-image analysis results of each section of the first photograph; determine which sections of a second photograph from the series of photographs have not changed (e.g., the user taking a selfie); determine that the rest of the sections have changed, and analyze just those changed sections; and combine the results of the analysis for the changed sections with the cached results for the unchanged sections to create a full analysis of the second photograph. However, this requires so much computational power (in determining which sections have changed or not changed for each entire photograph), that the saving in processing time and resources is marginal. Furthermore, such a process requires more computational/storage power than the cell phone has, and thus the fog/cloud must be called upon, thereby slowing down the overall process.

While the present invention can be utilized in the scenario just described, for purposes of explanation the present invention will be described in a scenario in which the focus of the photographs (i.e., the person, object, etc. in the foreground) shows no major changes between the photographs in the series of photographs, and the background in the series of photographs is relatively static.

In either scenario, a high-level overview of one or more embodiments of the present invention is described as follows. The present invention utilizes sensors on devices to determine camera shift. As such, the system is able to understand the amount of image shifting that is caused by the camera shift, and applies this understanding when deciding which cached analysis results are to be reused on subsequent photographs from the series of photographs.

In one or more embodiments of the present invention, a Convolutional Neural Network (CNN) is utilized to 1) analyze the photograph(s), and 2) determine which cached analysis results are to be reused. This leads to shifting node weights (described below) in the CNN, and does not require an N-to-N full image analysis of all of the photographs in the series of photographs, thus requiring insignificant computational workloads compared to previous approaches.

As just mentioned, one or more embodiments of the present invention utilize a Convolutional Neural Network (CNN). As the name implies, a CNN utilizes logic similar to that of a Traditional Neural Network (TNN), but with several significant differences. Before discussing these differences, a description of neurons used in any type of neural network is now presented.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affecting the operation of one or more other bio-electrically connected other biological neurons.

An electronic neural network similarly is made up of electronic neurons. However, unlike biological neurons, electronic neurons are never technically "inhibitory", but are only "excitatory" to varying degrees.

In a TNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

A CNN is similar to a TNN in that both utilize interconnected electronic neurons. However, a CNN is different from a TNN in that 1) a CNN has neural layers whose sizes are based on filter sizes, stride values, padding values, etc. (see FIG. 3) and 2) utilize a convolution scheme to analyze image data (see FIG. 4). A CNN gets its "convolutional" name based on a convolution (i.e., a mathematical operation on two functions to obtain a result) of filtering and pooling pixel data (a mathematical operation on two functions) in order to generate a predicted output (obtain a result).

Figure 3:
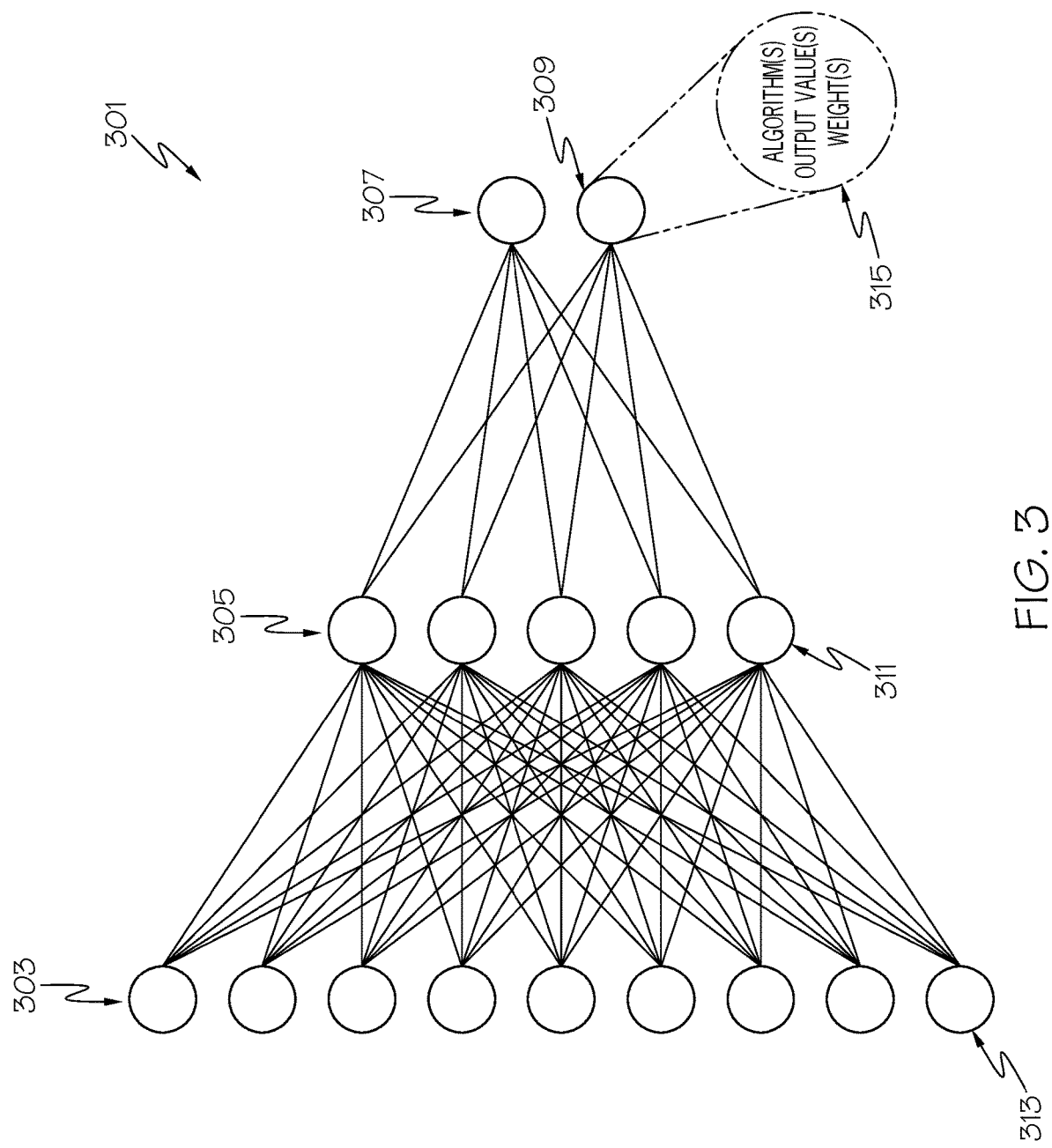
FIG. 3 illustrates an exemplary Convolutional Neural Network (CNN) as used in one or more embodiments of the present disclosure.

With reference now to FIG. 3, an exemplary component of a CNN 301 is presented. Each depicted node in FIG. 3 represents a neuron (i.e., an electronic neuron). In accordance with one or more embodiments of the present invention, an input layer 303 includes neurons that receive data that describes pixels from a photograph. Rather than being connected to an equal number of neurons (as in a TNN), the neurons from the input layer 303 of the CNN 301 connect to a fewer number of neurons in a middle layer 305, which connect to an even fewer number of neurons in the output layer 307. However, it is not necessarily always the case that the number of neurons in subsequent layers in the CNN 301 are decreased. For example, CNN 301 can have a middle layer 305 that is the same size as the input layer 303, or can have a middle layer 305 that is larger than the size of the input layer 303, depending on how the CNN 301 is designed. More specifically, for a given convolutional layer and/or pooling layer, the filter size, the stride value, and the padding (e.g., weight) value of the neuron(s) determine the size of the next layer. While a standard CNN has convolutional layers and pooling layers, some variants of CNN have other types of layers like deconvolution layers and upsampling layers. Those generally increase the size of the following layer.

As just mentioned, each node in the depicted CNN 301 represents an electronic neuron, such as the depicted neuron 309. As shown in block 315, each neuron (including neuron 309) functionally includes at least three features: an algorithm, an output value, and a weight.

The algorithm is a mathematic formula for processing data from one or more upstream neurons. For example, assume that one or more of the neurons depicted in the middle layer 305 send data values to neuron 309. Neuron 309 then processes these data values by executing the algorithm shown in block 315, in order to create one or more output values, which are then sent to another (not shown) neuron or another device. Each neuron also has a weight, that is specific for that neuron and/or for other connected neurons.

For example, assume that neuron 313 is sending the results of its analysis of a piece of data to neuron 311. Neuron 311 has a first weight that defines how important data coming specifically from neuron 313 is. If the data is important, then data coming from neuron 313 is weighted heavily, thus causing the algorithm(s) within neuron 311 to generate a higher output, which will have a heavier impact on neurons in the output layer 307. Similarly, if neuron 311 has been determined to be significant to the operations of neuron 309, then the weight in neuron 311 will be increased, such that neuron 309 receives a higher value for the output of the algorithm in the neuron 311. These weights are adjustable for one, more, or all of the neurons in the CNN 301, such that a reliable output will result from output layer 307. Such adjustments may be performed manually or automatically.

When manually adjusted, the weights are adjusted by the user, sensor logic, etc. in a repeated manner until the output from output layer 307 matches expectations. For example, assume that input layer 303 receives pixel values (color, intensity, shading, etc.) from pixels in a photograph of a dog. If the output from output layer 307 is a vector that is predetermined to describe a dog (e.g., (1,2,4,10)), then the weights (and alternatively the algorithms) are adjusted until the vector (1,2,4,10), or a vector that is mathematically similar, is output from output layer 307 when pixel data from a photograph of a dog is input into input layer 303.

When automatically adjusted, the weights (and/or algorithms) are adjusted using "back propagation", in which weight values of the neurons are adjusted by using a "gradient descent" method that determines which direction each weight value should be adjusted to. This gradient descent process moves the weight in each neuron in a certain direction until the output from output layer 307 improves (e.g., gets closer to (1,2,4,10)).

Figure 4:
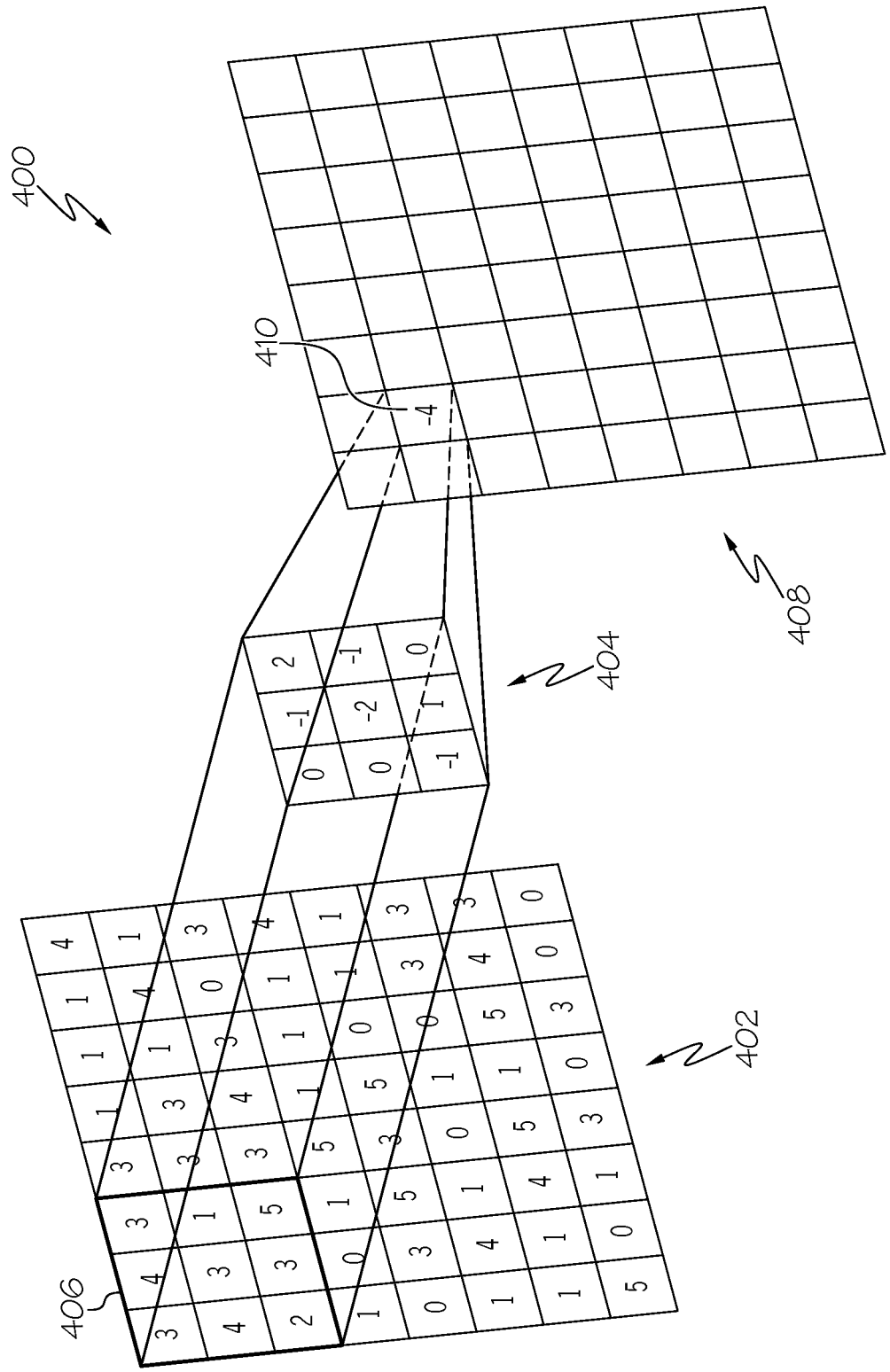
FIG. 4 depicts additional functionality detail of the CNN illustrated in FIG. 2.
Figure 5:
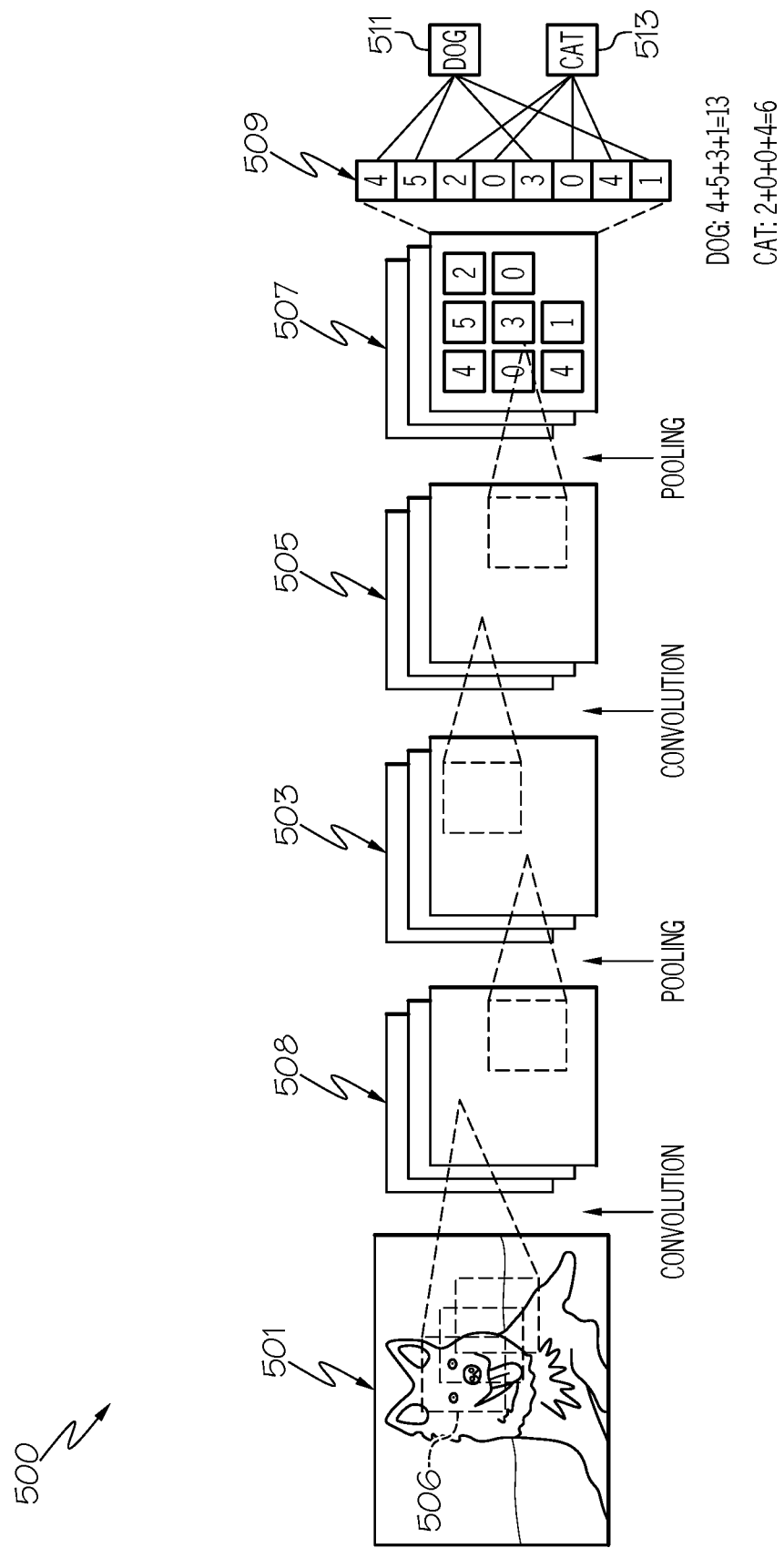
FIG. 5 illustrates an exemplary photo image being evaluated using the CNN in accordance with one or more embodiments of the present invention.

As described herein, a CNN process includes 1) a convolution stage (depicted in FIG. 4), followed by a 2) pooling stage and a classification stage (depicted in FIG. 5).

With reference now to FIG. 4, a convolution/pooling scheme to analyze image data is presented in CNN convolution process 400. As shown in FIG. 4, pixel data from a photographic image populates an input table 402. Each cell in the input table 402 represents a value of a pixel in the photograph. This value is based on the color and intensity for each pixel. A subset of pixels from the input table 402 is associated with a filter 404. That is, filter 404 is matched to a same-sized subset of pixels (e.g., pixel subset 406) by sliding the filter 404 across the input table 402. The filter 404 slides across the input grid at some predefined stride (i.e., one or more pixels). Thus, if the stride is "1", then the filter 404 slides over in increments of one (column) of pixels. In the example shown in FIG. 4, this results in the filter 404 sliding over the subset of pixels shown as pixel subset 406 (3,4,3,4,3,1,2,3,5 when read from left to right for each row) followed by filter sliding over the subset of pixels just to the right of (4,3,3,3,1,3,2,5,3). If the stride were "2", then the next subset of pixels that filter 404 would slide to would be (3,3,1,1,3,3,5,3,4).

Filter 404 is applied against each pixel subset using a mathematical formula. That is, the values in the filter 404 are added to, subtracted to, multiplied by, divided by, or otherwise used in a mathematical operation and/or algorithm with the values in each subset of pixels. For example, assume that the values in filter 404 are multiplied against the pixel values shown in pixel subset 406 ((3x0)+(4x−1)+(3x2)+(4x0)+(3x−2)+(1x−1)+(2x−1)+(3x1)+(5x0)) to arrive at the value of −4. This value is then used to populate feature map 408 with the value of −4 in cell 410.

In a preferred embodiment, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tan h function, and so on.

In an embodiment, each subset of pixels uses a same filter. However, in a preferred embodiment, the filter used by each subset of pixels is different, thus allowing a finer level of granularity in creating the feature map.

With reference now to FIG. 5, the pooling stage and a classification stage (as well as the convolution stage) of a CNN 500 during inference processing is depicted. That is, once the CNN is optimized by adjusting weights and/or algorithms in the neurons (see FIG. 3), by adjusting the stride of movement of the pixel subset 406 (see FIG. 4), and/or by adjusting the filter 404 shown in FIG. 4, then it is trusted to be able to recognize similar objects in similar photographs. This optimized CNN is then used to infer (hence the name inference processing) that the object in a new photograph is the same object that the CNN has been trained to recognize.

As shown in FIG. 5, assume that pixels from a photograph 501 are used as inputs to the input table 402 shown in FIG. 4, using a CNN that has been previously defined and optimized to recognize the image of a dog. Assume further that a series of pixel subsets, including the pixel subset 506 (analogous to pixel subset 406 shown in FIG. 4) are convolved (using the process described in FIG. 4), thus resulting in a set of feature maps 508 (analogous to feature map 408 shown in FIG. 4). Once the feature maps 508 are generated, they are pooled into smaller pooled tables 503, in order to reduce the dimensionality of the values, thereby reducing the number of parameters and computations required in the CNN process. Once these pooled tables 503 are created, they themselves are then convoluted to create new (and even more compressed) feature maps 505, which are then pooled to create even more compressed pooled tables 507.

The pooled tables 507 (which in an embodiment is actually a single table) is "unrolled" to form a linear vector, shown in FIG. 5 as a fully connected layer 509. Connected to prediction output, including prediction output 511 (for a dog) and prediction output 513 (for a cat).

For example, assume that for a prediction output to be considered accurate, it must have an arbitrarily chosen total value of 10 or greater for the sum of values from cells in the fully connected layer 509 to which it is connected. As such, the prediction output 511 is connected to cells in the fully connected layer 509 that have the values of 4, 5, 3, and 1, resulting in a sum total of 13. Thus, the CNN 500 concludes that photograph 501 includes an image of a dog. In one or more embodiments, an output function, such as a softmax function, amplifies larger output values, attenuates smaller output values, and normalizes all output values in order to ensure that their total sum is one. That is, rather than assigning an arbitrary number (e.g., 10) as being what the sum total of values in certain cells from the connected layer 509 must exceed in order to indicate that a particular entity (e.g., a dog) is portrayed in the new photograph, an output function such as a softmax function dynamically adjusts the output values and then normalizes them, such that they sum up to 1.0 or some other predetermined number. Thus, while the described values shown in FIG. 5 describe the concept of output values describing entities in the photographs, in practice a static threshold value is not used in certain embodiments. Rather, in this alternative/preferred embodiment, the system utilizes a normalized summation (as just described), in order to further control the output characteristics, thus more accurately determining the label of the object in the photograph.

The prediction output 513 for a cat is only 6 (2+0+0+4) based on the cells in the fully connected layer 509 to which it is attached. However, if the pixels in the photograph 501 were of a cat, then the fully connected layer 509 (if properly trained) would result in the values of the cells in the fully connected layer 509 that are connected to the prediction output 511 to total less than 10, while the values of the cells in the fully connected layer 509 that are connected to the prediction output 513 would be more than 10.

As mentioned above, photos are often taken in sequence of a same object by a moving camera. However, this movement of the camera causes the object to "move" between different photographs in the sequence of photographs. Such movement may be linear (i.e., the camera moves from side to side or up and down while keeping the same normal orientation with the object being photographed); rotational (i.e., the camera stays in a same location, but pans left/right and/or up/down); or zooming (i.e., the camera maintains the same normal orientation to the object being photographed, but moved towards or away from the object being photographed). For purposes of illustration, the embodiment of linear movement of the camera is discussed in accordance with one or more embodiments of the present invention.

Figure 6:
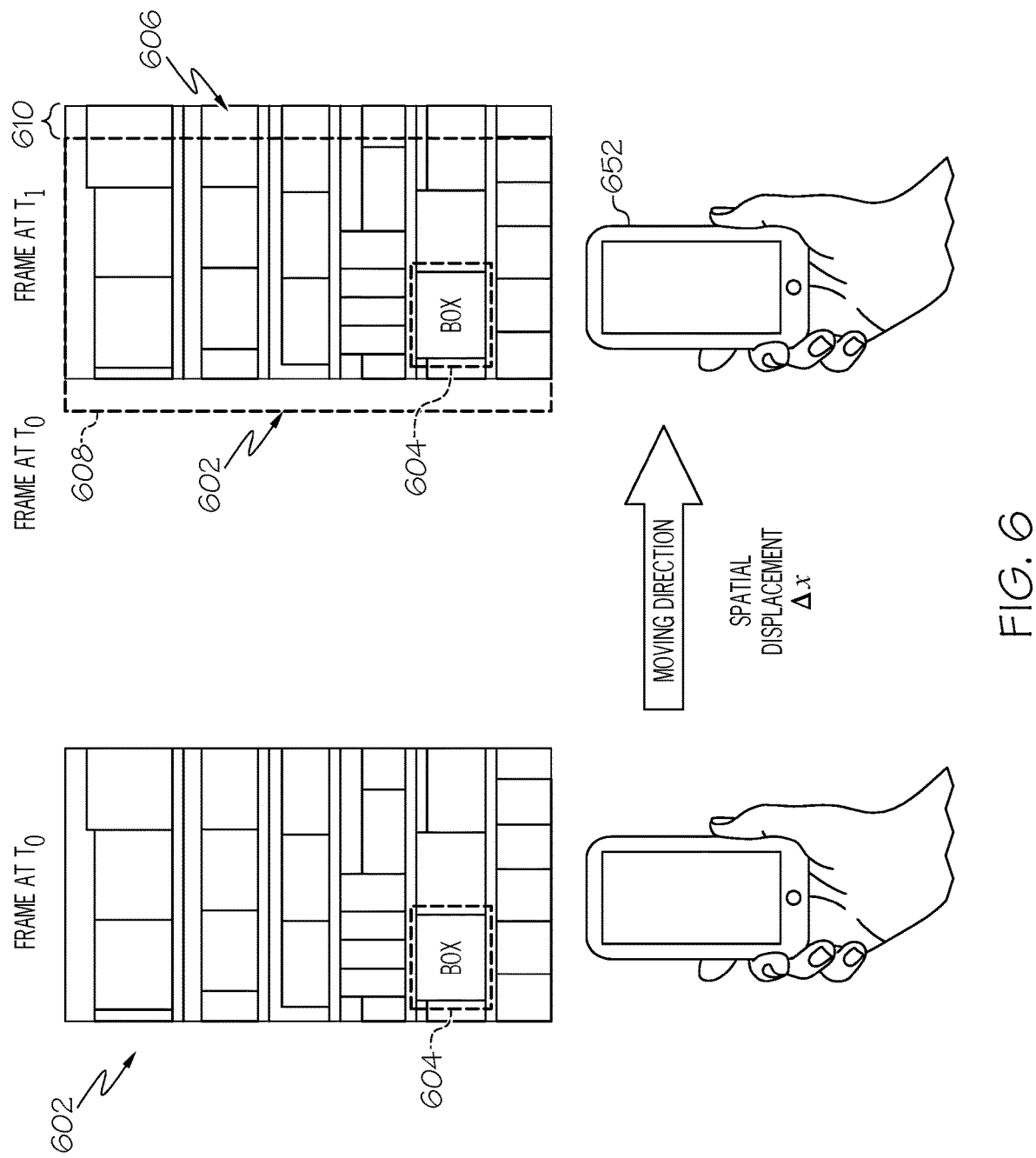
FIG. 6 illustrates an exemplary image shift caused by movement of a camera in accordance with one or more embodiments of the present invention.

As shown in FIG. 6, a first image 602 is taken by a camera 652 (analogous to camera 152 shown in FIG. 1) at a first time $t_0$. First image 602 captures the images of several objects, background, etc., including an object 604 (e.g., a BOX of cereal). At time $t_1$ (after time $t_0$), the camera 652 has moved to the right, resulting in a second image 606. As shown in FIG. 6, the second image 606 still includes the object 604, but it has now shifted to the left of the captured second image 608 (due to the camera 652 moving to the right). While some of the image from first image 602 is lost in the second image 606 (depicted as lost portion 608), it has picked up new imagery shown in shift size 610.

Assume now that a CNN analysis (or other photographic analysis) has been performed, resulting in the object 604 being identified as a box of cereal. Assume further that a label "BOX" has been created for that box of cereal, and that label is superimposed on top of the image of the box of cereal.

When the second image 606 is captured (including the image of the box of cereal), a new CNN analysis can be performed on all of the second image, thus resulting again in the identification of the box of cereal (and the labeling thereof). Alternatively, the system could cache the results of each portion of the first image 602. That is, the pixel information, identity, and label for each object is cached. Thereafter, the pixel information for each subsection of the second image 608 is captured. If a subsection in the second image matches the pixel information in a cached result from the first image 602, then the object is labeled in the second image 608 with the same label as found in the first image 602. However, this requires extensive computational power to find and compare every section of the two images. In addition, the pixel values sampled at the same target locations in two frames may slightly differ, due to lighting, sampling issues in the image sensor, etc., thus further making exact pixel matching impractical.

Therefore, in a preferred embodiment of the present invention, sensors in the camera 652 detect the precise movement of the camera 652 between the time that the first image 602 was captured and the second image 606 was captured, thus quickly identifying the duplicate capture of the object 604. This allows the object 604 to be quickly labeled in the second image using minimal processing power (i.e., that which is within the camera 652 itself).

Figure 7:
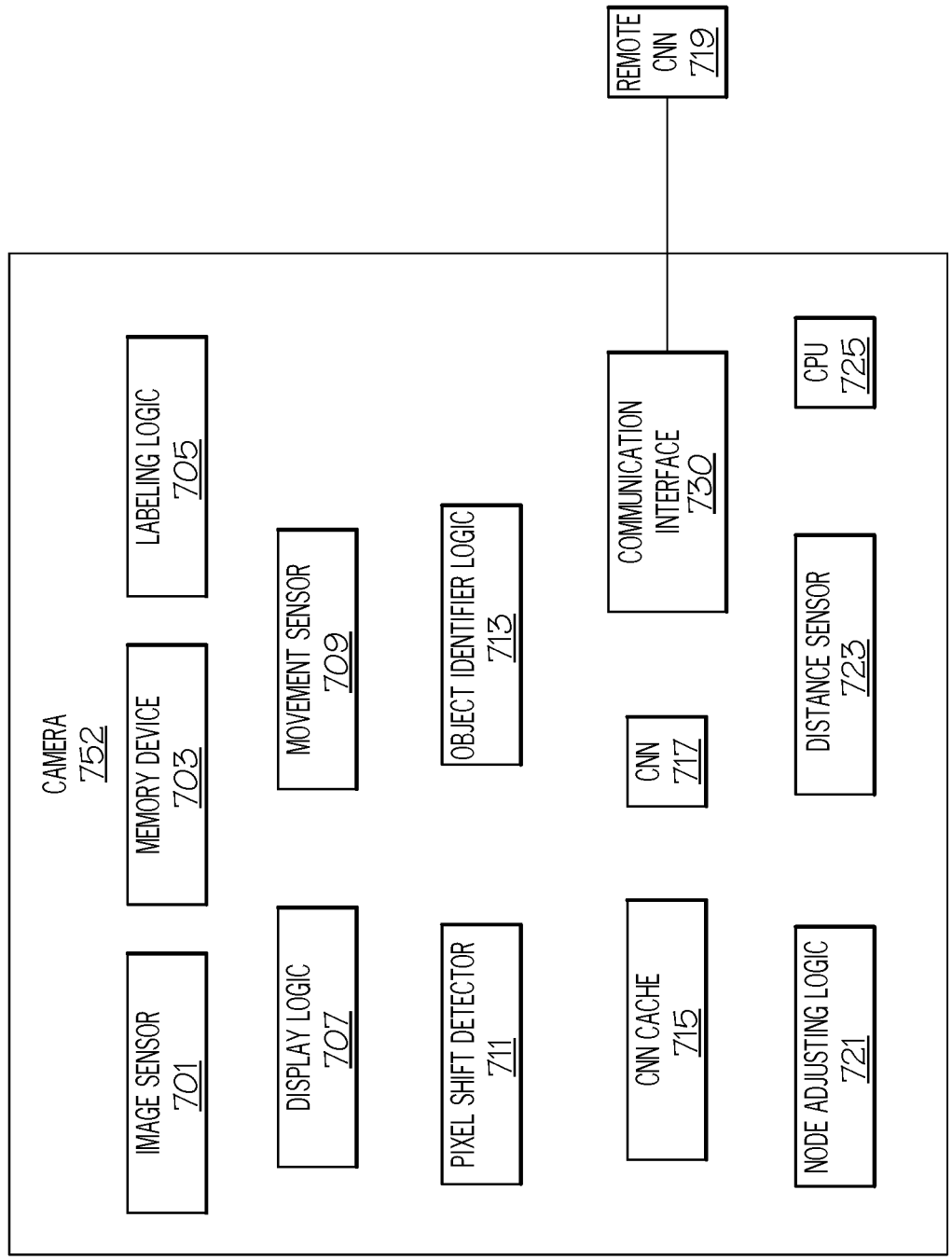
FIG. 7 depicts details of a sensor-enabled camera utilized in one or more embodiments of the present invention.

With reference now to FIG. 7, details of one or more features of an exemplary camera 752 (analogous to camera 652 shown in FIG. 6 and camera 152 shown in FIG. 1) as used in the present invention is presented.

Image sensor 701 is an optic sensor (e.g., a Complementary Metal-Oxide-Semiconductor—CMOS) that converts light into an electronic signal, which is then sent to a memory device 703 (e.g., a memory card).

Labeling logic 705 is a hardware circuit that converts an output from an algorithm (e.g., using CNN) into a text label. For example, and in one embodiment, labeling logic takes the array (4,5,3,1) shown in FIG. 5 as an input, and outputs a label "DOG", which can be overlaid onto a digital image using display logic 707.

Movement sensor 709 is a sensor that detects movement of the camera 752. In an embodiment of the present invention, movement sensor 709 is a self-contained unit, such as an accelerometer. In another embodiment, movement sensor 709 uses inputs from an external device (not shown), such as a gear or wheel. That is if camera 752 is mounted on a track, and the movement of camera 752 along the track is causes by gears/wheels in a mechanical device turning (thus propelling the camera), sensor readings describing the movement of such gears/wheels accurately describe the movement of the camera 752.

The pixel shift detector 711 is a hardware device that captures movement of a particular pixel or set of pixels. For example, assume that the pixel subset 406 shown in FIG. 4 is first found in first image 602 in FIG. 6, and later is found in second image 606. As such, the pixel shift detector 711 measures the pixel distance between the pixel subset 406 in the first image 602 as compared to its location in the second image 606.

The object identifier logic 713 is logic (e.g., the CNN logic or an abbreviated version of the CNN logic described herein) used to identify an object within a photograph. In an embodiment, if the camera 752 has sufficient processing power to run a full version of the CNN, then it will do so. However, if the camera 752 has insufficient processing power to run a full version of the CNN, then a limited version (e.g., in which only one convolution/pooling operation is performed, in which only a limited number of prediction outputs is supported, etc.) is performed. In a preferred embodiment, however, the object identifier logic 713 uses the movement information obtained from the movement sensor 709 and pixel shift detector 711 to identify and re-label the object in subsequent photographs. For example, assume that the label is found in a CNN cache 715, having been previously created by a local on-board CNN 717 or a remote CNN 719 (e.g., in the fog 204 and/or cloud 206 shown in FIG. 1), which is (preferably wirelessly) connected to the camera 752 via a network interface 730 (analogous to network interface 130 shown in FIG. 1).

Node adjusting logic 721 is logic that adjusts weights and/or algorithms in the CNN using regressive analysis. That is, node adjusting logic is a processor that has been preconfigured to determine the accuracy of the predicted outputs (as shown in the example of FIG. 5), and then adjust the weight and/or algorithm in the neurons in the CNN (see FIG. 3) until the prediction outputs accurately describe the photographed object.

Distance sensor 723 detects a distance from the camera 752 to one or more objects being photographed. Distance sensor 723 utilizes a phase shift in an electronic signal from when the signal is emitted from the distance sensor 723 to when the signal is bounced back and received by the distance sensor 723. In various embodiments, the distance sensor 723 uses signals that are electromagnetic (e.g., infrared light) or sonic (e.g., ultrasonic sounds). Such signals have a wavelength, whose phase is different from the time that it is emitted to the time that it is bounced back and received. This wavelength difference is known as a phase shift, and (when combined with a timer) precisely measures distance without using a physical measuring device (e.g., a measuring tape). In another embodiment, distance from the camera 752 to the object being photographed is determined using parallax. That is, if a user moves the camera 752 by a certain distance while photographing the same scene/target, the camera 752 will see the same targets or visual features that appear on both frames. Due to the camera displacement, the images of the same targets will appear in slightly different locations on each frame, which is called parallax. These on-frame location differences and the camera displacement are then used to estimate the distance to the target, such that a separate distance measurement sensor is not necessary. As such, in one embodiment of the present invention, only motion sensors are needed to measure the amount of movement by the camera 752 in order to perform one or more of the steps described herein.

In an embodiment of the present invention, the functions performed by one or more of labeling logic 705, display logic 707, object identifier logic 713, CNN 717, and node adjusting logic 721 are performed by an on-board Central Processing Unit (CPU) 725 executing some or all of the instructions found in IPL 148 shown in FIG. 1.

Figure 8:
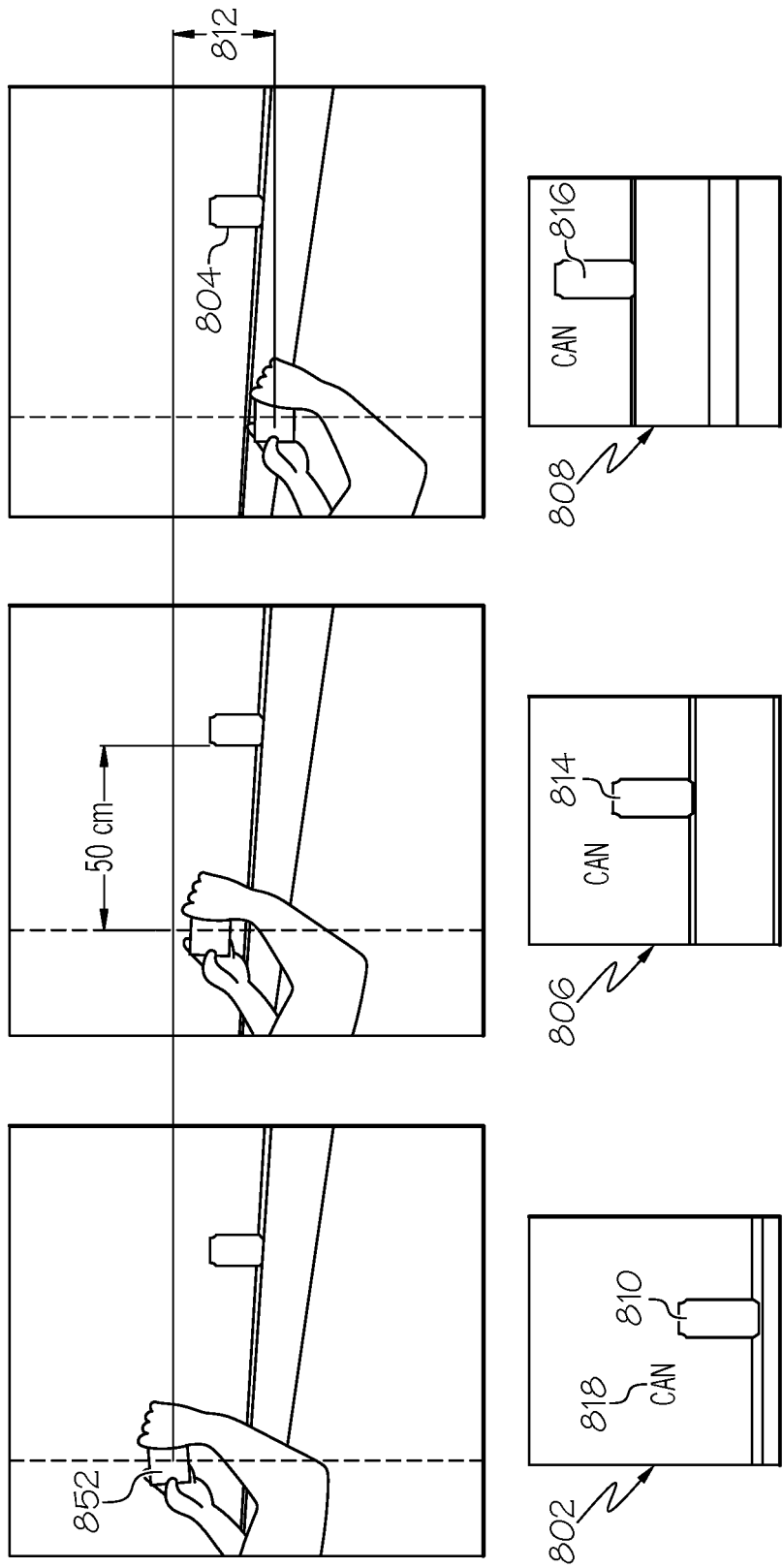
FIG. 8 illustrates an exemplary use case in accordance with one or more embodiments of the present invention.

With reference now to FIG. 8, assume that camera 852 (analogous to camera 752 shown in FIG. 7) is taking a series of photographs of a physical object 804 (a beverage can) as camera 852 moves downward (along a Y-axis). As shown in first image 802, second image 806, and third image 808, the object image 810 of the physical object 804 appears to be moving upwards in each subsequent image/photograph. However, the physical object 804 is actually in a fixed location. The apparent movement of physical object 804 is the result of the downward camera movement 812 of the camera 852 as it captures first image 802, second image 806, and third image 808.

In accordance with one or more embodiments of the present invention, if the distance between the camera 852 and the physical object 804 is known (shown as 50 cm in FIG. 8), then a correlation between the movement of the camera 852 (e.g., where the camera movement 812 is 20 cm downwards) and the repositioning of the picture of the object image 810 in the subsequent images can be determined. That is, trigonometry tells the system that by knowing how much the camera 852 moves and in what direction (using the movement sensor 707 shown in FIG. 7), and knowing the distance from the camera 852 to the physical object 804 (using the distance sensor 723 shown in FIG. 7), then a correlation between the calculated distance and direction of movement of the physical object 804 is used to determine the new position of the object image 810 on the subsequent images.

Figure 9A:
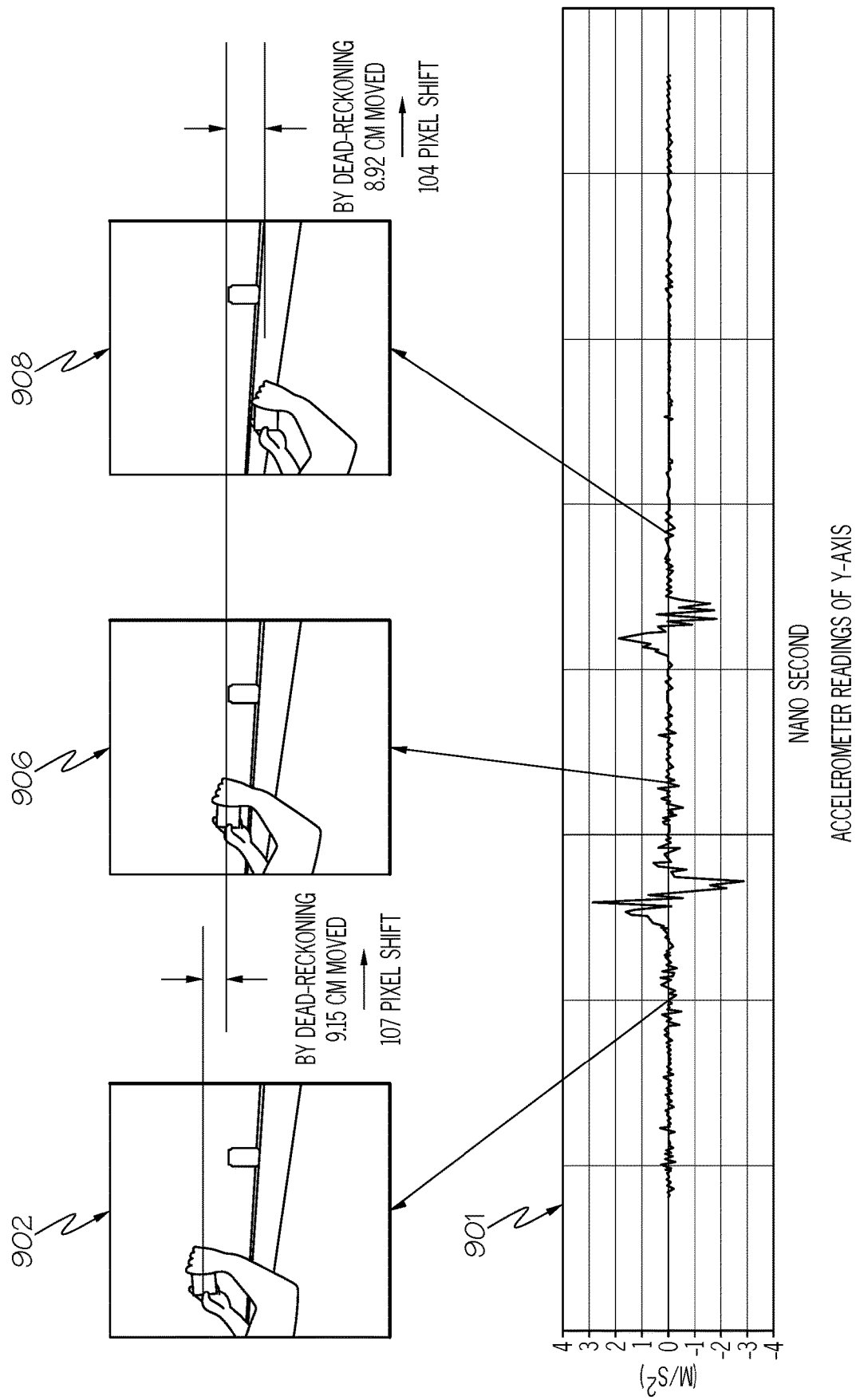
FIGS. 9A-9B depicts correlating graphs for the exemplary use case illustrated in FIG. 8.
Figure 9B:
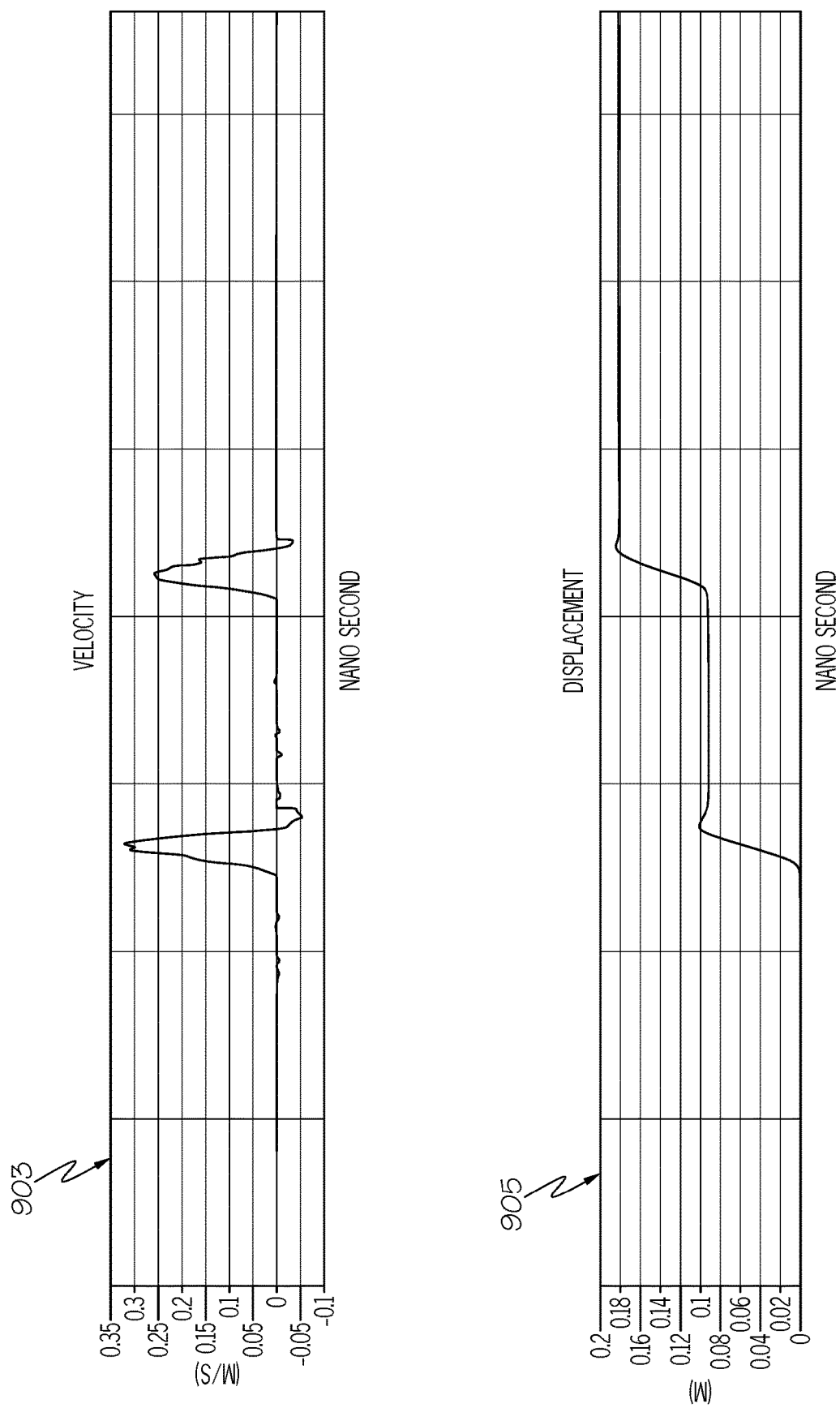

The determination of the amount of camera movement is shown in an exemplary manner in FIGS. 9A-9B. Assume that the events shown in FIG. 9A as image capturing 902, image capturing 906, and image capturing 908 are physical activities (i.e., taking photographs when the camera is at different locations) that correlate/correspond to the respective first image 802, second image 806, and third image 808 shown in FIG. 8. As shown in FIGS. 9A-9B, readings represented by an accelerometer graph 901 (whose data represent an acceleration of the camera), velocity graph 903 (whose data represent real-time velocity of the camera), and displacement graph 905 (whose data represent the cumulative distance that the camera has moved) are used by the system (e.g., CPU 725 shown in FIG. 7 executing code from IPL 148 depicted in FIG. 1) to determine that the camera first moved 9.15 cm downward, and then moved 8.92 cm downward. The system uses this information, along with the distance from the camera to the physical object, to determine that there was first a pixel shift of 107 pixels upward (corresponding to the 9.15 cm downward movement of the camera), followed by a pixel shift of 104 pixels upward (corresponding to the 8.92 cm downward movement of the camera).

Thus, any object depicted as object image 814 in FIG. 8 is determined to be the same object depicted as object image 816, which is also the same object depicted in object image 810. Since the system has determined that the object is the same object in all three images (802, 806, 808), then the same label "CAN" for object image 810, shown as label 818 in first image 802, is overlaid onto object image 814 and object image 816. That is, the present invention not only determines the object as being the same in all three photographs, but (using CNN) also determines the identity/label for the same object in all three photographs.

The presently described process is much faster and more efficient that prior art processes when computing the cache shift (i.e., determining when to use a previous CNN result found in a CNN cache). For example, when using DeepMon (a You Only Look Once—YOLO algorithm) that identifies an object by comparing its image pixels to a cohort of known image pixels for certain objects), 165.75 ms per frame are required to retrieve the appropriate data from the appropriate cache. Using the present invention, however, only 0.42042 ms are required to compute accelerometer samples. While both DeepMon and the present invention require overhead time for inference processing, etc., the much faster front end of the present invention results in a much faster process for identifying and labeling objects in photographs.

While the present invention has been described thus far as compensating for linear (up/down and left/right) movement of the camera, the use of a CNN and the processes described herein are also applicable to the results of a camera rotating or zooming towards or away from the object.

When the camera rotates, the images being captured change based on a skewed version of the image. That is, not only do the images move (as in the images discussed in FIG. 8), but there are also skewed changes. Thus, if a first photograph is taken from a position that is normal to (perpendicular to) the object, and a second photograph is taken by rotating the camera to a position that is no longer perpendicular to the object, then some of the object is lost in the second image while other objects are captured in the second photograph. However, if the rotation of the camera is minimal, such that there is only minimal distortion of the images in the second photograph, then the process described in FIGS. 9A-9B is still used.

In another embodiment of the present invention, however, minimal rotation is not a prerequisite for the present invention to work properly. That is, in this embodiment skew is restored after a rotation of the camera. Specifically, assume that a first frame f1 is taken. Thereafter, assume that the camera is rotated, and then a second frame f2 is taken. Just as in the lateral movement illustrated in FIG. 6, first frame f1 and second frame f2 (taken after camera rotation) share a partly overlapped region of the target scene, even though the overlapped regions are not in the identical perspective due to the rotation. This mismatched perspective prohibits the system from simply reusing the cached results obtained from the first frame f1. Thus, in order to make second frame f2 compatible with the cached results from first frame f1, the system transforms the perspective of second frame f2 to be identical to the perspective of first frame f1. In an embodiment of the present invention, this perspective transform is done by applying simple geometric transformations on the image. Such a process, including the perspective transformation just described, experimentally takes only 3.693 ms per frame, which is much shorter than the amount of time taken by prior art such as DeepMon and other YOLO systems. Furthermore, after this perspective transformation occurs, the present invention uses the same processes used in the linear motion case (e.g., reusing cache identification labels, etc.). Furthermore, cache erosion is addressed in the same way as described below.

Assume now that the camera zooms in on the object. This may be caused by using an adjustable zoom (enlarging) lens (either optic or digital), or it may be caused by physically moving the camera closer to or farther away from the object. However, this movement is also detected by the sensors on the camera shown in FIG. 7. As such, a correlation between the zooming level and the pixel shifts is determined, in order to label the same object in different photographs. For example, assume that a first photograph shows the can in FIG. 8 in the middle of the first photograph, and that the can takes up 1 cm$^2$ of the photograph. Assume now that the camera zooms in 2×. As such, the image of the can now takes up 4 cm$^2$ of the photograph, which expand out from the original 1 cm$^2$ of the photograph. As such, these 4 cm$^2$ of the photograph depict the same can, and the second photograph labels these 4 cm$^2$ of the photograph with the label "CAN".

Thus, in the zooming-in case just described, in one or more embodiments of the present invention scaling the previous boxes and labels are approximations, because zooming-in introduces finer details in the picture which were not visible in the previous (seen at a farther distance) frame. While the present invention enlarges the previously detected results, it does not process all the newly apparent finer details. Thus, in one or more embodiments of the invention in which zooming-in occurs, scalings are approximations.

On the other hand, zooming-out scenarios using the present invention are not approximations. That is, if the user moves the camera away from the target, the new frame will consist of a center region with a scaled-down view of the previous frame, and newly appeared outer region enclosing the center region. As such, (1) the present invention shrinks the previously detected results to fit in the scaled-down center region. As zoom-out does not introduce additional picture details in this center region and most likely will lose finer details, shrinking the detected results do not introduce any loss of information. (2) At the same time, the present invention performs brand-new computation for the newly appeared outer region. To combine both (reused center and newly computed outer), the system applies the same processes described above.

Figure 10:
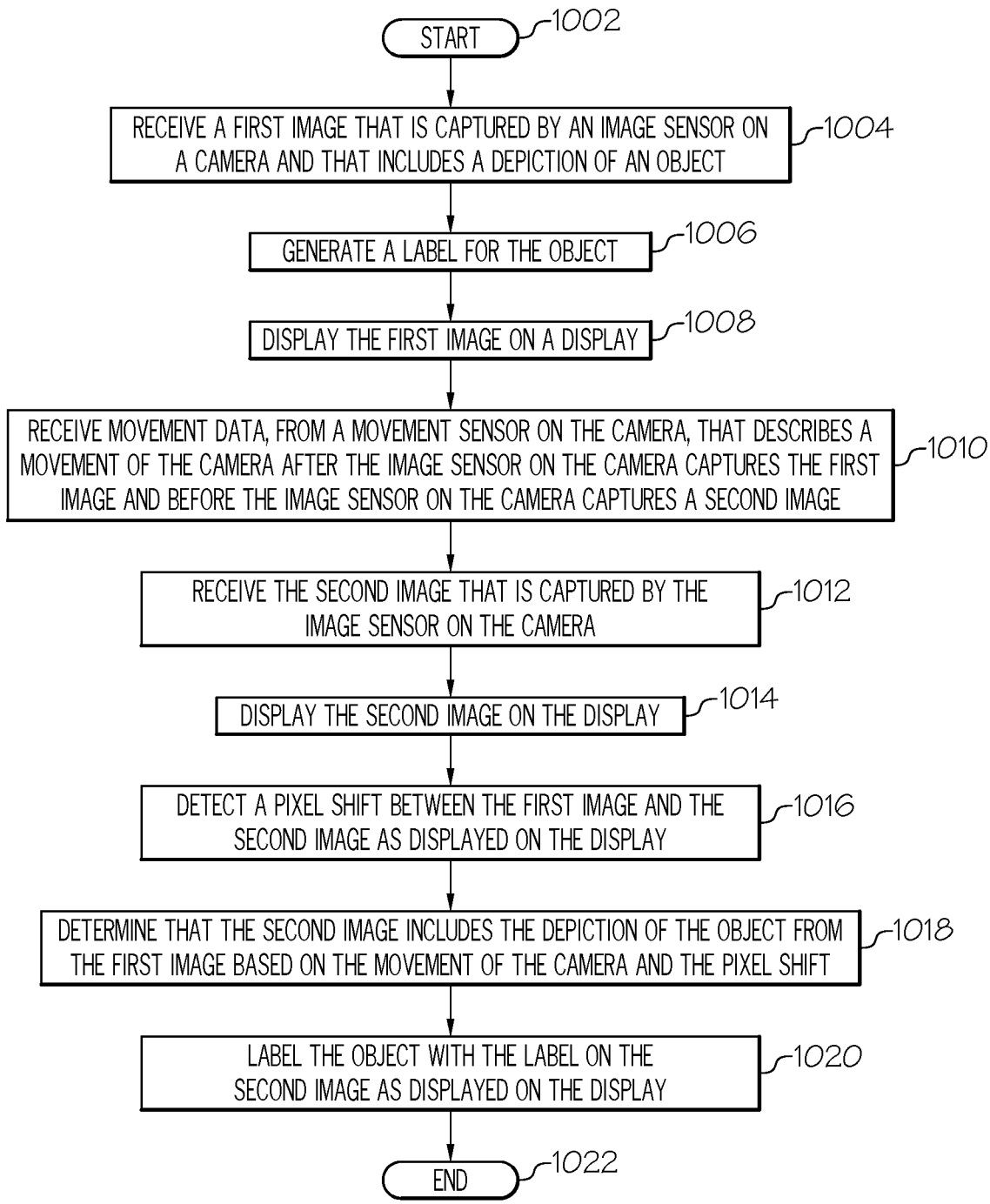
FIG. 10 is a high-level flow chart of one or more steps performed in accordance with one or more embodiments of the present invention.

With reference now to FIG. 10, a high-level flow chart of one or more steps performed in accordance with one or more embodiments of the present invention is presented.

After initiator block 1002, one or more processors (e.g., CPU 725 shown in FIG. 7) receive a first image (see FIG. 8), as described in block 1004. As described herein, the first image is captured by an image sensor (e.g., image sensor 701) on a camera (e.g., camera 752), and the first image includes a depiction of an object (e.g., first image 802 shown in FIG. 8).

As describe in block 1006, the processor(s) then generate a label (e.g., "CAN") for the object, using the CNN-based image recognition process described herein.

As described in block 1008, the processor(s) display the first image on a display (e.g., display 110 shown in FIG. 1, which is part of sensor-enabled camera 152 in one or more embodiments of the present invention).

As described in block 1010, the processor(s) receive movement data from a movement sensor on the camera (see FIG. 7). This movement data describes a movement of the camera after the image sensor on the camera captures the first image and before the image sensor on the camera captures a second image.

As described in block 1012, the processor(s) receive the second image that is captured by the image sensor on the camera.

As described in block 1014, the processor(s) display the second image on the display (e.g., second image 806 shown in FIG. 8).

As described in block 1016, the processor(s) detect a pixel shift between the first image and the second image as displayed on the display. For example, any set of pixels in the first photograph (first image) can be identified in a different location in the second photograph (second image). This difference in position of the set of pixels is called "pixel shift".

As described in block 1018, the processor(s) determine that the second image includes the depiction of the object from the first image based on the movement of the camera and the pixel shift, as described herein.

As described in block 1020, the processor(s) then label the object with the label (that was created from the first image) on the second image as displayed on the display.

The flow chart ends at terminator block 1022.

In an embodiment of the present invention, the processor(s) input the first image into a Convolutional Neural Network (CNN). In a preferred embodiment, the CNN has been trained to recognize a particular object, such that the CNN creates an output that identifies and labels the object in the first image. This output information from the CNN is cached into a CNN cache (see element 715 in FIG. 7), and is later used to label the object in the second image based on the movement of the camera and the pixel shift (see FIG. 7).

In an embodiment of the present invention, during initial training of the CNN and/or during inference usage of a trained CNN, the processor(s) adjust weights in nodes (i.e., neurons) in the CNN based on the movement of the camera. That is, if movement of the camera reduces the accuracy of the CNN in recognizing and labeling a particular object, then a regressive gradient descent will fine tune the neurons/nodes in the CNN, thus making the CNN more accurate in identifying and labeling specific objects.

In an embodiment of the present invention, during initial training of the CNN and/or during inference usage of a trained CNN, the processors(s) adjust weights in nodes in the CNN based on the pixel shift. That is, if the pixel shift from one photograph to another reduces the accuracy of the CNN in recognizing and labeling a particular object, then a regressive gradient descent will fine tune the neurons/nodes in the CNN, thus making the CNN more accurate in identifying and labeling specific objects.

In an embodiment of the present invention, the processor(s) determine a distance between the camera and the object (e.g., using distance sensor 723 shown in FIG. 7), and then correlate the movement of the camera with the pixel shift based on the distance between the camera and the object. That is, if the camera is 50 cm from the object being photographed, and the camera physical moves downwards 9.15 cm, then an exemplary pixel shift will be 107 pixels. However, if the camera is 100 cm from the object being photographed, and the camera still physically moves downwards 9.15 cm, then the pixel shift will be much less (e.g., less than 30 pixels). This information is then used to determine whether a same object is being captured in a subsequent photograph.

In an embodiment of the present invention, the movement sensor is an accelerometer, as describe herein.

In various embodiments of the present invention, the movement of the camera is lateral movement, rotational movement, and/or zooming movement, as describe herein.

As described herein and in one or more embodiments of the present invention, the second frame includes a newly appeared region which was not present in the first frame (see FIG. 6). The present invention thus performs convolution and pooling operations for (1) this newly appeared region there are no prior results on this region, and (2) a limited part of the previously present region which is influenced by this newly appeared region. The influence happens because a convolution filter traverses across the border where the new region and the previous region meet. In this case, even though the convolution filter is centered at a previously presented pixel, its convolution computation involves other pixels from the newly appeared region within its filter area. Generally, such an influenced region grows as it progresses to the deeper layers, making the cacheable area smaller along the layer. This phenomenon is often called cache erosion. As such, the present invention not only caches the final results but also part of the internal convolution results along its outer border. Thereafter, when the camera moves and new pixels appear beyond one of the borders, the present invention performs the aforementioned part (2) using the newly appeared pixels and the cached convolution results along the borders, hands over those results to the next layer, and does the same procedure at that layer.

By computing the above procedure at each layer, the present invention completes processing the output layer. In one or more embodiments of the present invention, the results of the output layer partly come from the previously cached results and partly come from the new computations done above.

An exemplary benefit from doing the above procedure is that the system has chances to detect new objects located along the border of the first frame, such as an object that was partially occluded in the first frame. For example, assume that there was an apple half-appeared, half-occluded at the left-side border of the first frame. Because it was only half-seen, assume further that the object detector did not detect the apple fully, and thus it was not labeled in the original frame. Now assume that the camera has moved a little toward the left direction. Accordingly, the entire scene seen in the second frame has moved towards the right direction, such that this camera movement resulted in the previously unseen half of the apple moving into the field of view. As such, the full body of the apple has appeared in the second frame. If the system computed only the newly appeared pixels and did not compute part of the previously cached results along the left-side border, then the system will not be able to detect the whole body of this apple, because the newly appeared pixels only contains the other half of this apple. In order to address this issue, then, in one or more embodiments of the present invention the system computes not only the newly appeared pixels but also a part of previously cached results that are influenced by these newly appeared pixels.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
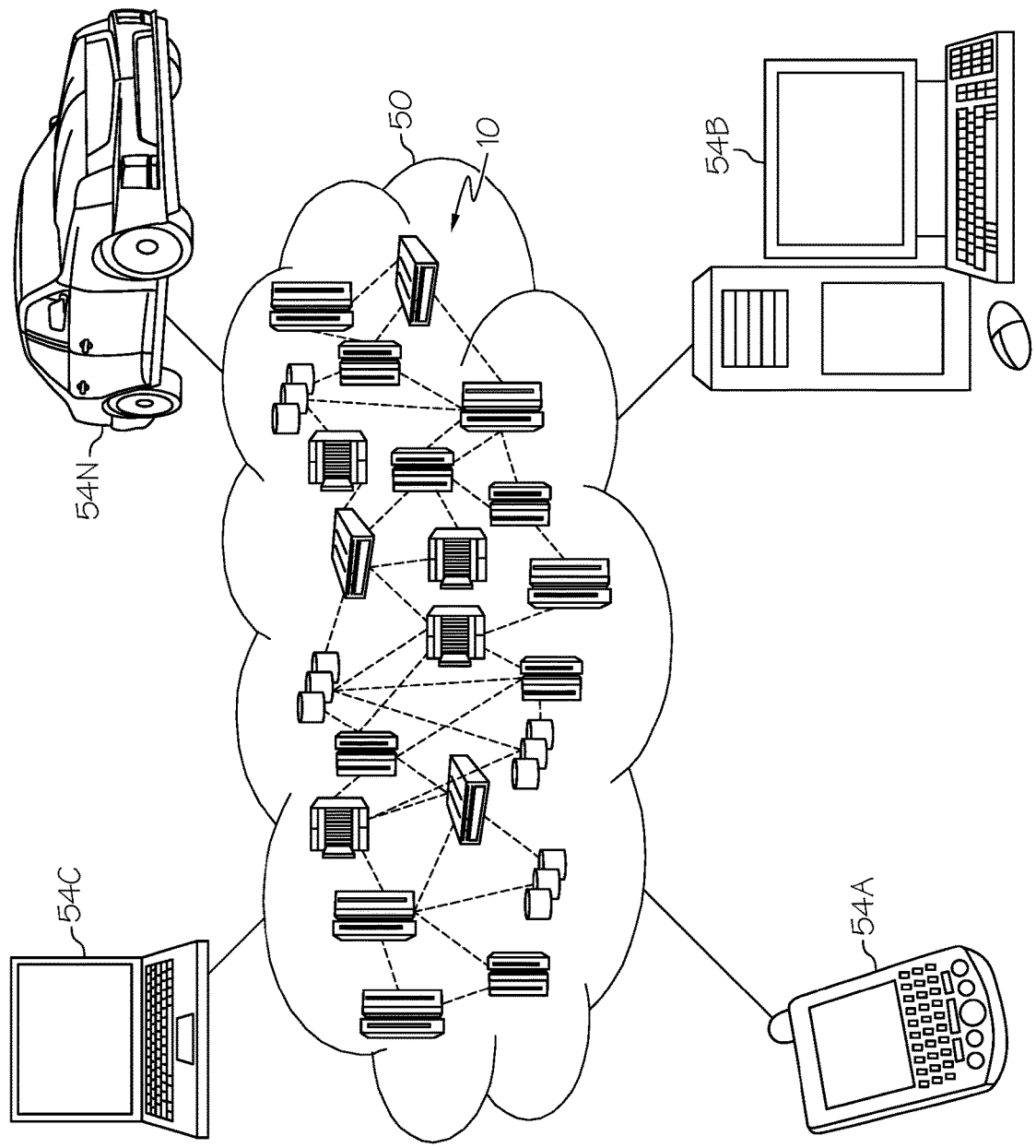
FIG. 11 depicts a cloud computing environment according to an embodiment of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 11 are intended to be illustrative only and that computing nodes 10 and cloud computing environment 50 can communicate with any type of computerized device over any type of network and/or network addressable connection (e.g., using a web browser).

Figure 12:
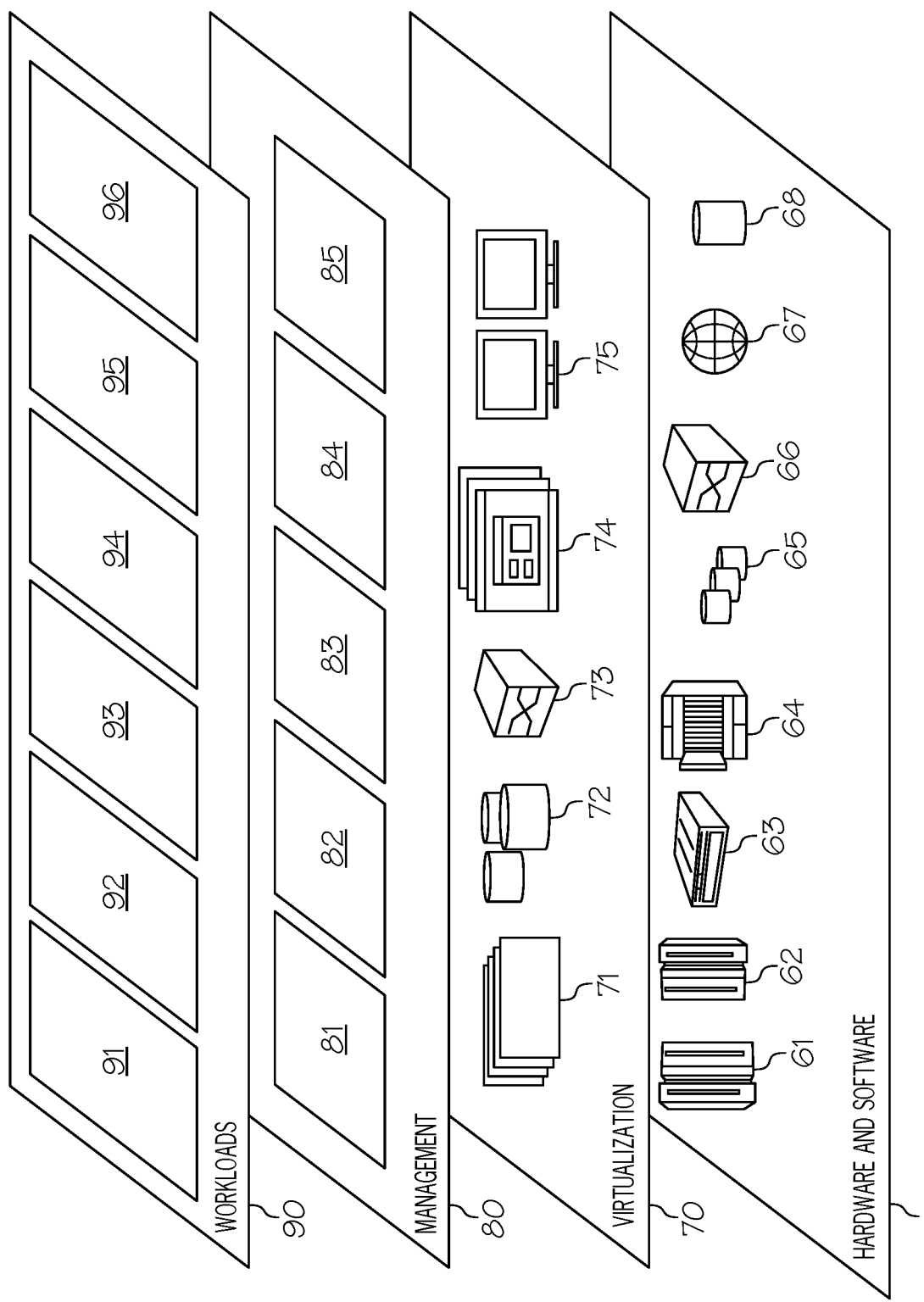
FIG. 12 depicts abstraction model layers of a cloud computer environment according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and image processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    receiving, by one or more processors, a first image, wherein the first image is captured by an image sensor on a camera, and wherein the first image includes a depiction of an object;
    generating, by one or more processors, a label for the object;
    displaying, by one or more processors, the first image on a display;
    receiving, by one or more processors, movement data from a movement sensor on the camera, wherein the movement data describes a movement of the camera after the image sensor on the camera captures the first image and before the image sensor on the camera captures a second image;
    receiving, by one or more processors, the second image, wherein the second image is captured by the image sensor on the camera;
    displaying, by one or more processors, the second image on the display;
    detecting, by one or more processors, a pixel shift between the first image and the second image as displayed on the display;
    determining, by one or more processors, that the second image includes the depiction of the object from the first image based on the movement of the camera and the pixel shift; and
    labeling, by one or more processors, the object with the label on the second image as displayed on the display.

2. The method of claim 1, further comprising:
    inputting, by one or more processors, the first image into a Convolutional Neural Network (CNN), wherein the CNN creates an output that identifies and labels the object in the first image;
    caching, by one or more processors, the output of the CNN; and
    utilizing, by one or more processors, the cached output of the CNN to label the object in the second image based on the movement of the camera and the pixel shift.

3. The method of claim 2, further comprising:
    adjusting, by one or more processors, weights in nodes in the CNN based on the movement of the camera.

4. The method of claim 2, further comprising:
    adjusting, by one or more processors, weights in nodes in the CNN based on the pixel shift.

5. The method of claim 1, further comprising:
    determining, by one or more processors, a distance between the camera and the object; and
    correlating, by one or more processors, the movement of the camera with the pixel shift based on the distance between the camera and the object.

6. The method of claim 1, wherein the movement sensor is an accelerometer.

7. The method of claim 1, wherein the movement of the camera is from a group of movements consisting of lateral movement, rotational movement, and zooming movement.

8. A computer program product comprising a computer readable storage medium having program code embodied therewith, wherein the computer readable storage medium is not a transitory signal per se, and wherein the program code is readable and executable by a processor to perform a method comprising:
    receiving a first image, wherein the first image is captured by an image sensor on a camera, and wherein the first image includes a depiction of an object;
    generating a label for the object;
    displaying the first image on a display;
    receiving movement data from a movement sensor on the camera, wherein the movement data describes a movement of the camera after the image sensor on the camera captures the first image and before the image sensor on the camera captures a second image;
    receiving the second image, wherein the second image is captured by the image sensor on the camera;
    displaying the second image on the display;
    detecting a pixel shift between the first image and the second image as displayed on the display;
    determining that the second image includes the depiction of the object from the first image based on the movement of the camera and the pixel shift; and
    labeling the object with the label on the second image as displayed on the display.

9. The computer program product of claim 8, wherein the method further comprises:
    inputting the first image into a Convolutional Neural Network (CNN), wherein the CNN creates an output that identifies and labels the object in the first image;
    caching the output of the CNN; and
    utilizing the cached output of the CNN to label the object in the second image based on the movement of the camera and the pixel shift.

10. The computer program product of claim 9, wherein the method further comprises:
    adjusting weights in nodes in the CNN based on the movement of the camera.

11. The computer program product of claim 9, wherein the method further comprises:
    adjusting weights in nodes in the CNN based on the pixel shift.

12. The computer program product of claim 8, wherein the method further comprises:
    determining a distance between the camera and the object; and
    correlating the movement of the camera with the pixel shift based on the distance between the camera and the object.

13. The computer program product of claim 8, wherein the movement sensor is an accelerometer.

14. The computer program product of claim 8, wherein the movement of the camera is from a group of movements consisting of lateral movement, rotational movement, and zooming movement.

15. A camera comprising:
    an image sensor, wherein the image sensor captures a first image and a second image, and wherein the first image includes a depiction of an object;
    a labeling logic that generates a label for the object;
    a display logic for displaying the first image;
    a movement sensor that generates movement data that describes a movement of the camera after the image sensor on the camera captures the first image and before the image sensor on the camera captures the second image;

a pixel shift detector that detects a pixel shift on the display between the first image being displayed and the second image being displayed; and an object identifier logic for determining that the second image includes the depiction of the object from the first image based on the movement of the camera and the pixel shift, wherein the object identifier logic labels the object with the label on the second image as displayed.

16. The camera of claim 15, further comprising:

a Convolutional Neural Network (CNN), wherein the CNN creates an output that identifies and labels the object in the first image by inputting the first image into the CNN; and a CNN cache, wherein the CNN cache caches the output of the CNN, wherein the object identifier logic labels the object with the label on the second image as displayed on the display by using the cached output of the CNN cache.

17. The camera of claim 16, further comprising:

node adjusting logic for adjusting weights in nodes in the CNN based on the movement of the camera and the pixel shift.

18. The camera of claim 15, further comprising:

a distance sensor, wherein the distance sensor determines a distance between the camera and the object, and wherein the movement of the camera is correlated with the pixel shift based on the distance between the camera and the object.

19. The camera of claim 15, wherein the movement sensor is an accelerometer.

20. The camera of claim 15, wherein the movement of the camera is from a group of movements consisting of lateral movement, rotational movement, and zooming movement.

* * * * *